United States Patent
Matar et al.

(10) Patent No.: US 11,877,318 B2
(45) Date of Patent: Jan. 16, 2024

(54) CHANNEL ASSESSMENT IN A SINGLE CONTENTION-FREE CHANNEL ACCESS PERIOD

(71) Applicant: TEXAS INSTRUMENTS INCORPORATED, Dallas, TX (US)

(72) Inventors: Yuval Matar, Kiryat Mozkin (IL); Yaron Alpert, Hod Hasharon (IL)

(73) Assignee: Texas Instruments Incorporated, Dallas, TX (US)

( * ) Notice: Subject to any disclaimer, the term of this patent is extended or adjusted under 35 U.S.C. 154(b) by 145 days.

(21) Appl. No.: 17/410,916

(22) Filed: Aug. 24, 2021

(65) Prior Publication Data

US 2023/0062784 A1 Mar. 2, 2023

(51) Int. Cl.
| | |
|---|---|
| *H04W 74/06* | (2009.01) |
| *H04L 5/00* | (2006.01) |
| *H04W 74/08* | (2009.01) |
| *H04W 88/08* | (2009.01) |

(52) U.S. Cl.
CPC ........... *H04W 74/06* (2013.01); *H04L 5/0055* (2013.01); *H04W 74/0816* (2013.01); *H04W 88/08* (2013.01)

(58) Field of Classification Search
CPC . H04W 74/06; H04W 74/0816; H04W 88/08; H04L 5/0055
See application file for complete search history.

(56) References Cited

U.S. PATENT DOCUMENTS

| | | | |
|---|---|---|---|
| 2003/0137970 A1* | 7/2003 | Odman | H04L 67/04 370/350 |
| 2004/0160930 A1* | 8/2004 | Choi | H04L 9/40 370/468 |
| 2005/0117530 A1* | 6/2005 | Abraham | H04W 52/0232 370/310 |

(Continued)

OTHER PUBLICATIONS

M. Hirzallah, W. Afifi and M. Krunz, "Provisioning QoS in Wi-Fi Systems With Asymmetric Full-Duplex Communications," in IEEE Transactions on Cognitive Communications and Networking, vol. 4, No. 4, pp. 942-953, Dec. 2018, doi: 10.1109/TCCN.2018.2878222. (Year: 2018).*

(Continued)

*Primary Examiner* — Edan Orgad
*Assistant Examiner* — Malick A Sohrab
(74) *Attorney, Agent, or Firm* — Mandy Barsilai Fernandez; Frank D. Cimino

(57) ABSTRACT

A device configured to communicate via a Wi-Fi channel obtains a contention-free access period on the Wi-Fi channel. The device sends a first probe packet to a receiving Wi-Fi device during the contention-free access period, with at least one parameter of a Wi-Fi transmitter of the Wi-Fi transceiver set to a first setting, and waits for a first reply period. The device sends a second probe packet to the receiving Wi-Fi device during the contention-free access period, with the at least one parameter of the Wi-Fi transmitter set to a second setting, where the second setting is based on a result of the first reply period, and waits for a second reply period. The device sets the at least one parameter of the Wi-Fi transmitter to a data packet setting, where the data packet setting is based at least on a result of the second reply period.

20 Claims, 3 Drawing Sheets

(56) References Cited

U.S. PATENT DOCUMENTS

| | | | | |
|---|---|---|---|---|
| 2011/0222408 A1* | 9/2011 | Kasslin | ................ | H04W 72/02 370/328 |
| 2013/0294394 A1* | 11/2013 | Kneckt | ................ | H04W 72/04 370/329 |
| 2013/0301441 A1* | 11/2013 | Russell | ................ | H04L 1/1621 370/252 |
| 2015/0139201 A1* | 5/2015 | Ko | ...................... | H04W 72/541 370/336 |
| 2016/0081106 A1* | 3/2016 | Zhou | .................... | H04W 24/10 370/328 |

OTHER PUBLICATIONS

WayBackMachine capture Archive: howiwifi.com/2020/07/13/802-11-frame-types-and-formats/ from Jul. 27, 2021 (Year: 2021).*

* cited by examiner

CHANNEL ASSESSMENT IN A SINGLE CONTENTION-FREE CHANNEL ACCESS PERIOD

BACKGROUND

Wi-Fi is a term used to represent communications using various ones of the Institute of Electrical and Electronics Engineers (IEEE) 802.11 family of wireless network protocols. Wi-Fi stations communicate by sending each other blocks of data (packets). Frequency bands allocated to Wi-Fi are subdivided into multiple channels, which have a specified frequency spacing, but may be aggregated for higher bandwidth communication. Channels may be shared between networks, with one Wi-Fi station transmitting locally on a channel at a time.

SUMMARY

In examples, a device includes a memory storing instructions and a processor. The processor is coupled to a Wi-Fi transceiver, which is configured to communicate via a Wi-Fi channel. The processor is configured to execute the instructions stored in the memory to obtain a contention-free access period on the Wi-Fi channel. The processor is also configured to send a first probe packet to a receiving Wi-Fi device during the contention-free access period, with at least one parameter of a Wi-Fi transmitter of the Wi-Fi transceiver set to a first setting, and to wait for a first reply period. The processor is further configured to send a second probe packet to the receiving Wi-Fi device during the contention-free access period, with the at least one parameter of the Wi-Fi transmitter set to a second setting, where the second setting is based on a result of the first reply period, and to wait for a second reply period. The processor is still further configured to set the at least one parameter of the Wi-Fi transmitter to a data packet setting, where the data packet setting is based at least on a result of the second reply period.

In another example, a method includes obtaining a contention-free access period on a Wi-Fi channel. The method also includes sending a first probe packet to a receiving Wi-Fi device during the contention-free access period, with at least one parameter of a Wi-Fi transmitter set to a first setting, and waiting for a first reply period. The method further includes sending a second probe packet to the receiving Wi-Fi device during the contention-free access period, with the at least one parameter of the Wi-Fi transmitter set to a second setting, where the second setting is based on a result of the first reply period, and waiting for a second reply period. The method still further includes setting the at least one parameter of the Wi-Fi transmitter to a data packet setting, where the data packet setting is based at least on a result of the second reply period.

BRIEF DESCRIPTION OF THE DRAWINGS

For a detailed description of various examples, reference will now be made to the accompanying drawings in which.

DETAILED DESCRIPTION

Figure 1:
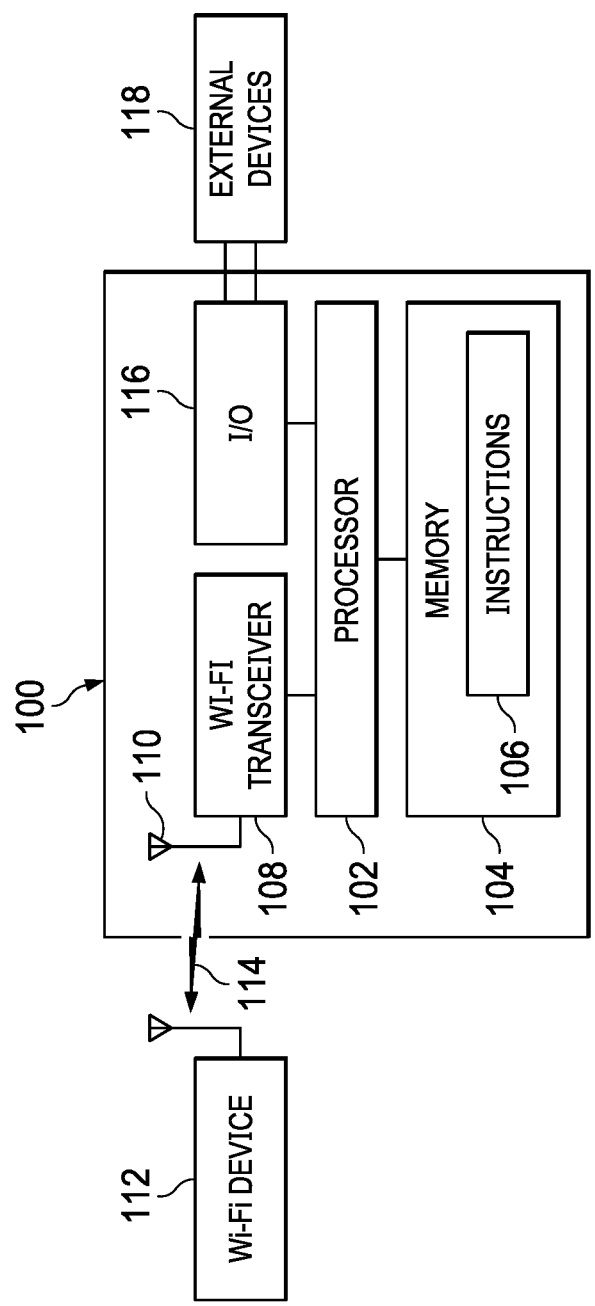
FIG. 1 is a block diagram of Wi-Fi device in accordance with various examples.

A Transmit Opportunity (TXOP) is a Quality of Service (QoS) feature of the IEEE 802.11 protocol that provides a Wi-Fi station with contention-free channel access for a limited period of time. In some Wi-Fi systems, a station obtains contention-free channel access by contending for a TXOP using Enhanced Distributed Channel Access (EDCA) protocol. In other Wi-Fi systems, channel coordination between stations for contention-free channel access is implemented using a Point Coordination Function (PCF) protocol. In such systems, an access point sends messages called beacon frames at regular intervals, with two periods between the beacon frames defined by the PCF protocol: a Contention Period (CP) and a Contention Free Period (CFP). In the CP, stations may use Carrier-Sense Multiple Access with Collision Avoidance (CSMA/CA) to obtain contention-free channel access. In the CFP, a station may obtain contention-free channel access by receipt of a Contention-Free-Poll (CF-Poll) packet from the access point. Whether using EDCA protocol or PCF protocol, obtaining contention-free channel access is a time-consuming process that is repeated every time the Wi-Fi device seeks to obtain a contention-free channel access period.

In some systems, a Wi-Fi device determines its transmission characteristics or operation profile by assessing channel conditions before transmitting a data packet over the channel. The channel conditions that are assessed may include throughput (e.g., bit rate), power consumption (e.g., transmitter power), air access methodology (e.g., CSMA/CA), packet transmitting format (e.g., single user (SU) or multi user (MU)), as well as other transmitter and channel characteristics. The Wi-Fi device may seek to estimate a highest bit rate and/or lowest transmitter power that can be used while still obtaining reliable transmission of data.

In some assessment processes, the Wi-Fi device sets its transmitter to trial settings for bit rate and/or transmitter power and sends a probe packet to a receiving Wi-Fi device. If the sending device receives a reply packet (e.g., an Acknowledgement, or ACK) from the receiving device, the sending device may interpret it as an indication that the trial settings were effective for reliable transmission of the probe packet. The Wi-Fi device may send one or more such probe packets sent at different trial settings to assess channel conditions.

After the Wi-Fi device has assessed channel conditions, it transmits its data packet using transmitter settings that are based on the assessed channel conditions. In order to assess channel conditions or transmit a data packet without interference from other devices in the network, the Wi-Fi device obtains a contention-free channel access period, as described above. As also described above, obtaining contention-free channel access is a time-consuming and inefficient process.

In accordance with various examples, a Wi-Fi device performs channel assessment by sending two or more probe packets within a single contention-free channel access period. In this way, a plurality of probe packets may be to assess channel conditions in less time than would elapse were each probe packet to be sent in a separately obtained contention-free channel access period.

FIG. 1 is a block diagram of Wi-Fi device 100 in accordance with various examples. The Wi-Fi device 100 includes a processor 102 coupled to a memory 104. The memory 104 stores instructions 106 that, when executed by the processor 102, cause the processor 102 to perform the various functionalities described herein. The memory 104 is one example of a non-transitory, computer-readable medium.

The processor 102 is coupled via a Wi-Fi transceiver 108 to an antenna 110 to facilitate communication with a second Wi-Fi device 112 via a Wi-Fi channel 114. In some examples, the Wi-Fi device 100 is a Wi-Fi station and the Wi-Fi device 112 is a Wi-Fi access point. In other examples, the Wi-Fi device 100 is a Wi-Fi access point and the Wi-Fi device 112 is a Wi-Fi station. In still other examples, the Wi-Fi device 100 and the Wi-Fi device 112 are both Wi-Fi stations, communicating in an ad hoc Wi-Fi network.

The processor 102 is further coupled via an Input/Output (I/O) circuit 116 to external devices 118. The external devices 118 may comprise input devices (such as switches and sensors) and/or output devices (such as indicators, actuators, and displays). The Wi-Fi device 100 includes other circuits and processors that are not shown in FIG. 1 to simplify explanation of the channel assessment and data transmission method described herein.

Figure 2:
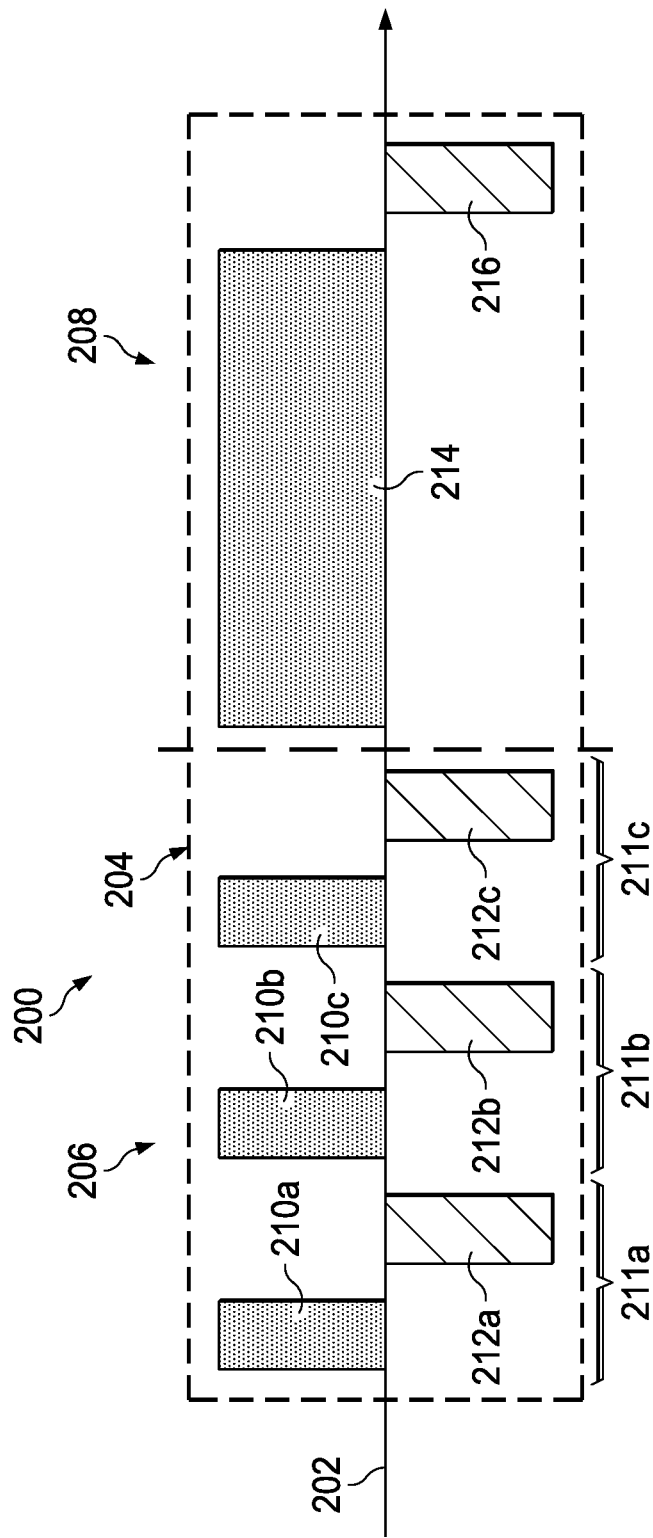
FIG. 2 is a timing diagram for channel assessment and data transmission in a single contention-free channel access period in accordance with various examples.

FIG. 2 is a timing diagram 200 for channel assessment and data transmission in a single contention-free channel access period in accordance with various examples. Using the Wi-Fi device 100 as an example, signals above and below a line 202 are signals transmitted from and received by (respectively) the Wi-Fi device 100 when performing a channel assessment and data transmission process according to the example. The signals in the timing diagram 200 occur within a single TXOP 204. While the contention-free channel access period of timing diagram 200 is the TXOP 204, in other examples other types of contention-free channel access periods may be obtained and used for channel assessment and data transmission.

The TXOP 204 comprises two phases, a channel assessment phase 206 and a data exchange phase 208. In the channel assessment phase 206, the Wi-Fi device 100 sends two or more probe packets 210a-210c to the Wi-Fi device 112 and receives (or does not receive, as discussed below) reply packets 212a-212c from the Wi-Fi device 112. In some examples, the probe packets 210a-210c are Physical Layer Convergence Protocol (PLCP) Protocol Data Units (PPDUs). In some examples, the probe packets 210a-210c are packets that are selected to cause the receiving Wi-Fi device to send a reply, such as No-Operation (No-Op) packets, a Null Data Packet Announcement (NDPA), a Request To Send (RTS) packet, or a variant of a Trigger Frame packet (e.g., a Basic Trigger Variant, a Beamforming Report Poll Variant, a Multi-User Block Ack Request (MU-BAR) Variant, a MU-RTS Variant).

Prior to sending the probe packet 210a, the processor 102 sets one or more parameters of a transmitter of the Wi-Fi transceiver 108 (Wi-Fi transmitter) to a first set of one or more trial settings. The processor 102 then sends the probe packet 210a via the Wi-Fi transceiver 108 to the Wi-Fi device 112. The processor 102 waits for a reply period 211a to receive the reply packet 212a. In some examples, the result of the reply period 211a is an ACK reply packet that provides feedback to the Wi-Fi device 100 simply by its receipt or non-receipt. Examples of such ACK packets include simple ACK packets, Hybrid Coordination Function (HCF) Black ACK packets, and Multi-Traffic Identifier (Multi-TID) ACK packets. In other examples, the result of the reply period 211a is a reply packet that includes feedback information relating to a received quality of the probe packet (referred to herein as a feedback reply packet). Examples of such feedback reply packets include a Clear To Send (CTS) packet, and a response to one of the variants of Trigger Frame packets described above. If the reply packet 212a is received, the reply period 211a terminates upon receipt of the reply packet 212a. If no reply packet 212a is received, the reply period 211a terminates after a preset period of time. Based on the result of the reply period 211a, the processor 102 proceeds with the probe packet 210b.

Prior to sending the probe packet 210b, the processor 102 sets the one or more parameters of the transmitter of the Wi-Fi transceiver 108 to a second set of one or more trial settings. The second set of trial settings are based on the result of the reply period 211a. If the reply packet 212a was not received, the transmitter parameters may be adjusted to lower communication performance, for example, throughput may be reduced and/or power consumption increased. If the reply packet 212a was received and was an ACK, the transmitter parameters may be adjusted to higher communication performance, for example, throughput may be increased and/or power consumption decreased. If the reply packet 212a was received and was a feedback reply packet, the transmitter parameters may be adjusted based on the feedback information in the feedback reply. In this way, the processor 102 attempts to assess the highest communication performance that may currently be obtained on the Wi-Fi channel while still obtaining reliable data transfer between the Wi-Fi device 100 and the Wi-Fi device 112.

After setting the parameters of the Wi-Fi transmitter to the second set of trial settings, the processor 102 sends the probe packet 210b to the Wi-Fi device 112. The processor 102 waits for a reply period 211b to receive the reply packet 212b. Based at least on the result of the reply period 211b, the processor 102 sets the one or more parameters of the transmitter of the Wi-Fi transceiver 108 to a third set of one or more trial settings. The third set of trial settings may be based on the results of both the reply periods 211a and 211b. The processor 102 then sends the probe packet 210c and waits for a reply period 211c to receive the reply packet 212c. The processor then sets the parameters of the Wi-Fi transmitter to data packet settings for use during the data exchange phase 208. The data packet settings may be adjusted from the third set of trial settings based at least on the result of the reply period 311c and may be based on one or more of the results of the reply periods 211a-211c.

After the parameters of the Wi-Fi transmitter are set to the data packet settings, in the data exchange phase 208 the processor 102 sends a data packet 214 to the Wi-Fi device 112 and awaits a reply packet 216. Where the Wi-Fi device 100 is an Internet of Things (IOT) device, the data packet 214 may comprise stored sensor values. Where the Wi-Fi device 100 is a smart phone or laptop computer, the data packet 214 may comprise audio or video data. While FIG. 2 shows a data packet being sent from the Wi-Fi device 100 to the Wi-Fi device 112 during the data exchange phase, in other examples the Wi-Fi device 112 may send a data packet to the Wi-Fi device 100 during the data exchange phase.

While FIG. 2 shows three probe packets 210a-210c being sent to the Wi-Fi device 112 in a single TXOP during the channel assessment phase 206, in other examples, only two probe packets may be sent before setting the parameters of the Wi-Fi transmitter to the data packet settings. In still other examples, while remaining within the maximum time limit of the TXOP 204, four or more probe packets may be sent before setting the parameters of the Wi-Fi transmitter to the data packet settings.

In various examples, the initial trial settings may be the same as the last settings that were successfully used to communicate with the Wi-Fi device 112. In other examples, the initial trial settings may be selected for highest or lowest communication performance with the Wi-Fi device 112. Highest performance may be considered as highest throughput and lowest power consumption. Lowest performance may be adjusted to lower communication performance, for example throughput may be reduced and/or power consumption increased.

While the channel assessment phase 206 and the data exchange phase 208 are shown in FIG. 2 as part of the single TXOP 204, in other examples, the channel assessment phase 206 is performed in a first TXOP and the data exchange phase 208 performed in a second TXOP. Splitting of the phases into two TXOPs might be desirable where a large amount of data is to be sent or received in the data exchange phase 208, resulting in the combined size of the channel assessment phase 206 and the data exchange phase 208 exceeding the maximum length of a single TXOP. Additionally, splitting the two phases into two TXOPs still obtains the benefit of performing the channel assessment phase 206 in less time than would elapse were each probe packet 210*a-c* to be sent in a separately obtained contention-free channel access period.

Figure 3:
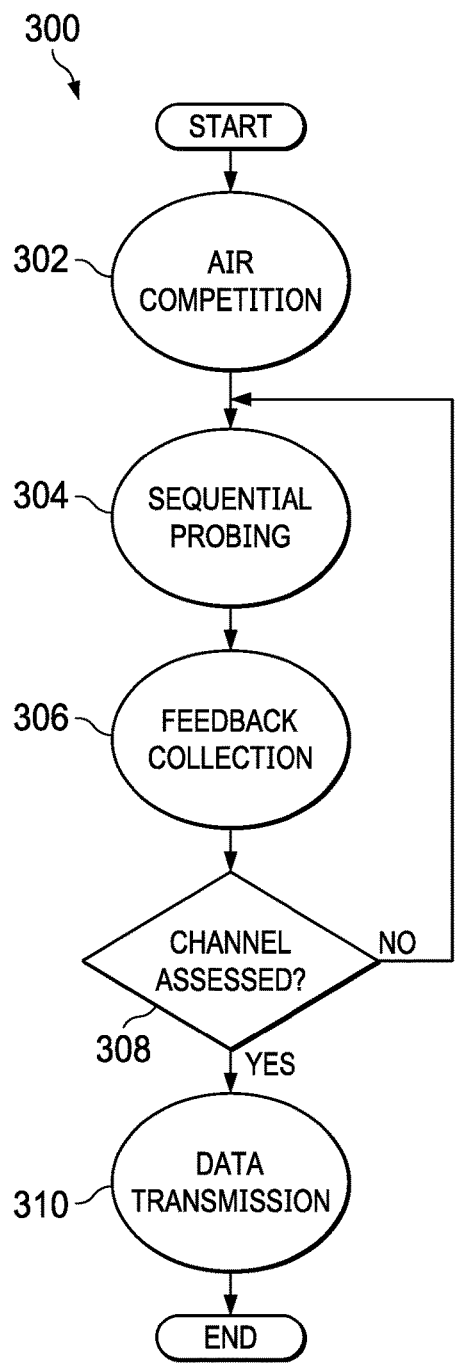
FIG. 3 is a state diagram for channel assessment and data transmission in a single contention-free channel access period in accordance with various examples.

FIG. 3 is a state diagram 300 for channel assessment and data transmission in a single contention-free channel access period in accordance with various examples. With reference to the elements of FIG. 1 and the timing diagram 200 of FIG. 2, channel assessment begins when the Wi-Fi device 100 enters the Air Competition state 302. In some Wi-Fi systems, the Wi-Fi device 100 uses the EDCA protocol to obtain a TXOP. In some Wi-Fi systems using the PCF protocol, the Wi-Fi device 100 uses CSMA/CA to obtain a contention-free channel access period during the Contention Period. In other such systems, the Wi-Fi device 100 obtains a contention-free channel access period by receiving a CF-Poll packet from the Wi-Fi device 112.

After the Wi-Fi device 100 has obtained a TXOP or other contention-free channel access period, it moves into the Sequential Probing state 304, in which it sends the probe packet 210*a* to the access port 112. The Wi-Fi device 100 then enters the Feedback Collection state 306, where it awaits the reply packet 212*a*. After either the Wi-Fi device 100 receives the reply packet 212*a* or the preset period of time elapses without a reply packet being received, the Wi-Fi device 100 moves into the Channel Assessed? state 308. If acceptable data packet settings have not been determined (e.g., the channel has not been adequately assessed), the Wi-Fi device 100 goes back to the Sequential Probing state 304 to send another probe packet.

The acceptability of the data packet settings is determined based on at least whether the data packet settings provide reliable communication with the Wi-Fi device 112. For a battery powered Wi-Fi device 100, the acceptability of the data packet settings may also be determined based on whether a power consumption that results in reliable communication is below a preset value. For other Wi-Fi devices 100, the acceptability of the data packet settings may further be determined based on whether a bit rate that results in reliable communication is high enough that the data packet 214 can be sent to the Wi-Fi device 112 within a single TXOP or other contention-free channel access period.

If the acceptable data packet settings have been determined, then the Wi-Fi device 100 enters the Data Transmission state 310, where it sends the data packet 214 to the Wi-Fi device 112. After the data packet has been sent, the state diagram 300 ends.

Figure 4:
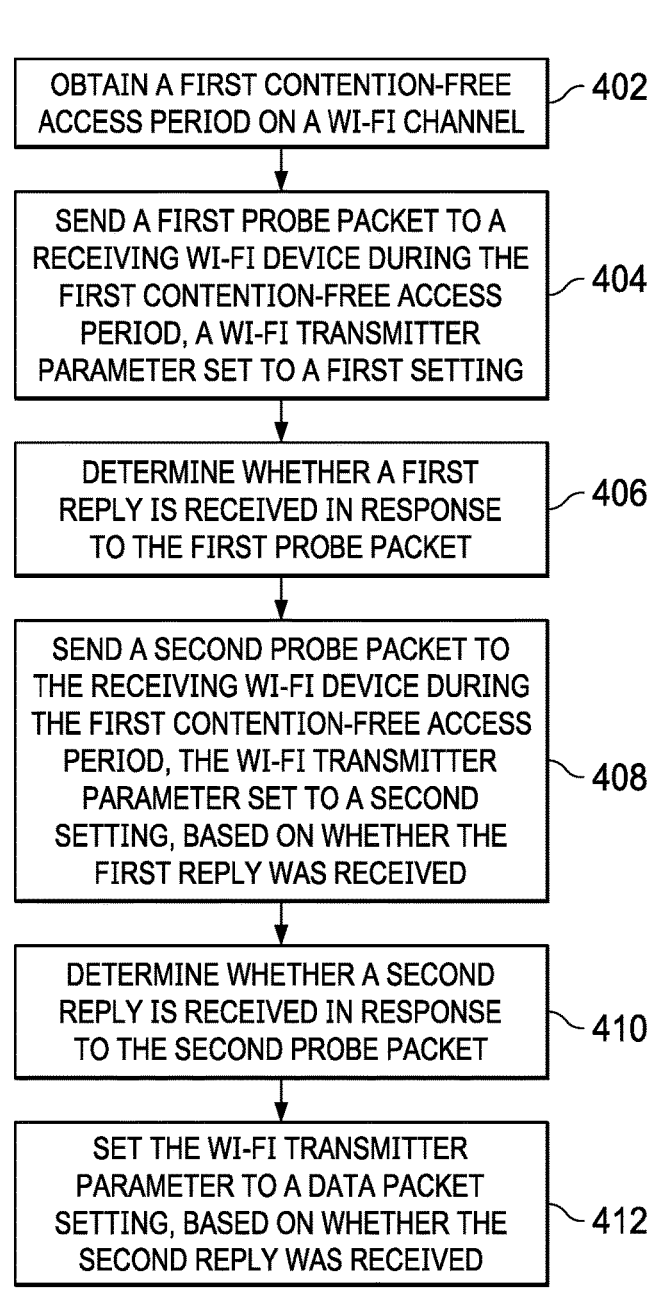
FIG. 4 is a flow diagram of a method for channel assessment in accordance with various examples.

FIG. 4 is a flow chart of a method 400 for channel assessment in accordance with various examples. With reference to the elements of FIG. 1 and the timing diagram 200 of FIG. 2, in step 402, a probing Wi-Fi device (in this example the Wi-Fi device 100) obtains a contention-free access period (in this example, the TXOP 204) on the Wi-Fi channel 114. In step 404, the Wi-Fi device 100 sets at least one parameter of the Wi-Fi transmitter of the Wi-Fi transceiver 108 to a first setting. The Wi-Fi device 100 then sends a first probe packet (in this example, the probe packet 210*a*) via the Wi-Fi channel 114 to a receiving Wi-Fi device (in this example, the Wi-Fi device 112) during the TXOP 204.

In step 406, the Wi-Fi device 100 determines whether a first reply (in this example, the reply packet 212*a*) is received in response to the first probe packet 210*a*. In step 408, the Wi-Fi device 100 sets the at least one parameter of the Wi-Fi transmitter to a second setting, which is based on whether the reply packet 212*a* was received. The Wi-Fi device 100 then sends a second probe packet (in this example, the probe packet 210*b*) to the Wi-Fi device 112 during the TXOP 204.

In step 410, the Wi-Fi device 100 determines whether a second reply (in this example, the reply packet 212*b*) is received in response to the second probe packet 210*b*. In step 412, the Wi-Fi device 100 sets the at least one parameter of the Wi-Fi transmitter to a data packet setting, which is based on whether the reply packet 212*b* was received.

In some examples, after setting the at least one parameter of the Wi-Fi transmitter to the data packet setting, the Wi-Fi device 100 sends a data packet (in this example, the data packet 214) to the Wi-Fi device 112 during the TXOP 204. In other examples, the Wi-Fi device 100 obtains a second contention-free access period and sends a data packet to the Wi-Fi device 112 during the second contention-free access period.

In some examples, at least one of the first and second probe packets is a PPDU. In other examples, at least one of the first and second probe packets is a packet that is configured to cause the receiving Wi-Fi device to send a reply and to cause no other change in a state of the receiving Wi-Fi device. In still other examples, at least one of the first and second reply packets is an acknowledgement (ACK) frame.

In some examples, the receiving Wi-Fi device is a Wi-Fi device other than an access point. In other examples, the contention-free access period is obtained using CSMA/CA in a Contention Period defined by a PCF protocol. In still other examples, the contention-free access period is obtained by receiving a CF-Poll packet from a Wi-Fi Access Point in a Contention Free Period defined by a PCF protocol.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Unless otherwise stated, "about," "approximately," or "substantially" preceding a value means+/−10 percent of the stated value. Modifications are possible in the described examples, and other examples are possible within the scope of the claims.

What is claimed is:

1. A device, comprising:
    a memory storing instructions; and
    a processor coupled to a Wi-Fi transceiver, the Wi-Fi transceiver configured to communicate via a Wi-Fi channel, the processor configured to execute the instructions stored in the memory to:
        obtain a first contention-free access period on the Wi-Fi channel;
        set at least one parameter of a Wi-Fi transmitter of the Wi-Fi transceiver to a first setting;
        send a first probe packet to a receiving Wi-Fi device during the first contention-free access period using the Wi-Fi transmitter based on the first setting;
        wait for a first reply period to determine a result responsive to the first probe packet;
        set the at least one parameter of the Wi-Fi transmitter from the first setting to a second setting based on the result of the first reply period;
        send a second probe packet to the receiving Wi-Fi device during the first contention-free access period using the Wi-Fi transmitter based on the second setting;
        wait for a second reply period to determine a result responsive to the second probe packet; and
        set the at least one parameter of the Wi-Fi transmitter to a data packet setting based at least on the result of the second reply period.

2. The device of claim 1, wherein the processor is configured to execute the instructions stored in the memory to:
    send a data packet to the receiving Wi-Fi device during the first contention-free access period after setting the at least one parameter of the Wi-Fi transmitter to the data packet setting.

3. The device of claim 1, wherein the processor is configured to execute the instructions stored in the memory to:
    obtain a second contention-free access period on the Wi-Fi channel; and
    send a data packet to the receiving Wi-Fi device during the second contention-free access period after setting the at least one parameter of the Wi-Fi transmitter to the data packet setting.

4. The device of claim 1, wherein at least one of the first probe packet and the second probe packet is a Physical Layer Convergence Protocol (PLCP) protocol data unit (PPDU).

5. The device of claim 1, wherein at least one of the first probe packet and the second probe packet is a No-Op packet.

6. The device of claim 1, wherein the result of at least one of the first reply period and the second reply period is a reply packet comprising feedback information.

7. The device of claim 1, wherein the receiving Wi-Fi device is a Wi-Fi Access Point.

8. The device of claim 1, wherein the first contention-free access period is a Quality of Service (QoS) Transmission Opportunity (TXOP) obtained using Enhanced Distributed Channel Access (EDCA) protocol.

9. The device of claim 1, wherein the first contention-free access period is obtained using Carrier-Sense Multiple Access with Collision Avoidance (CSMA/CA) in a Contention Period (CP) defined by a Point Coordination Function (PCF) protocol.

10. The device of claim 1, wherein the first contention-free access period is obtained by receiving a Contention-Free-Poll (CF-Poll) packet from a Wi-Fi Access Point in a Contention Free Period (CFP) defined by a PCF protocol.

11. A method comprising: obtaining in a probing Wi-Fi device a first contention-free access period on a Wi-Fi channel;
    setting at least one parameter of a Wi-Fi transmitter of the probing Wi-Fi device to a first setting;
    sending by the probing Wi-Fi device a first probe packet to a receiving Wi-Fi device during the first contention-free access period using the Wi-Fi transmitter based on the first setting;
    waiting for a first reply period to determine a result responsive to the first probe packet; setting the at least one parameter of the Wi-Fi transmitter from the first setting to a second setting;
    sending by the probing Wi-Fi device a second probe packet to the receiving Wi-Fi device during the first contention-free access period using the Wi-Fi transmitter based on the second setting;
    waiting for a second reply period to determine a result responsive to the second probe packet; and setting the at least one parameter of the Wi-Fi transmitter to a data packet setting based at least on the result of the second reply period.

12. The method of claim 11 further comprising:
    sending by the probing Wi-Fi device a data packet to the receiving Wi-Fi device during the first contention-free access period after setting the at least one parameter of the Wi-Fi transmitter to the data packet setting.

13. The method of claim 11 further comprising:
    obtaining by the probing Wi-Fi device a second contention-free access period on the Wi-Fi channel; and
    sending by the probing Wi-Fi device a data packet to the receiving Wi-Fi device during the second contention-free access period after setting the at least one parameter of the Wi-Fi transmitter to the data packet setting.

14. The method of claim 11, wherein at least one of the first probe packet and the second probe packet is a Physical Layer Convergence Protocol (PLCP) protocol data unit (PPDU).

15. The method of claim 11, wherein at least one of the first probe packet and the second probe packet is a No-Op packet.

16. The method of claim 11, wherein the result of at least one of the first reply period and the second reply period is a reply packet comprising feedback information.

17. The method of claim 11, wherein the receiving Wi-Fi device is a Wi-Fi Access Point.

18. The method of claim 11, wherein the first contention-free access period is a Quality of Service (QoS) Transmission Opportunity (TXOP) obtained using Enhanced Distributed Channel Access (EDCA) protocol.

19. The method of claim 11, wherein the first contention-free access period is obtained using Carrier-Sense Multiple Access with Collision Avoidance (CSMA/CA) in a Contention Period (CP) defined by a Point Coordination Function (PCF) protocol.

20. The method of claim 11, wherein the first contention-free access period is obtained by receiving a Contention-Free-Poll (CF-Poll) packet from a Wi-Fi Access Point in a Contention Free Period (CFP) defined by a PCF protocol.

* * * * *